(12) United States Patent
Yano

(10) Patent No.: US 6,927,921 B2
(45) Date of Patent: Aug. 9, 2005

(54) POWER TRANSMISSION DEVICE, LENS BARREL, AND IMAGE PICKUP APPARATUS

(75) Inventor: Yukiteru Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/869,440

(22) Filed: Jun. 16, 2004

(65) Prior Publication Data

US 2005/0018319 A1 Jan. 27, 2005

(30) Foreign Application Priority Data

Jun. 19, 2003 (JP) ........................................ 2003-174150

(51) Int. Cl.⁷ ............................................ G02B 15/14
(52) U.S. Cl. ...................................... 359/696; 359/697
(58) Field of Search ........................ 359/694, 696–698, 359/703, 823, 824

(56) References Cited

U.S. PATENT DOCUMENTS

| 5,166,829 A | * 11/1992 | Iizuka ......................... 359/699 |
| 5,848,302 A | * 12/1998 | Machida ...................... 396/60 |
| 6,160,670 A | * 12/2000 | Nakayama et al. ......... 359/696 |
| 6,396,645 B1 | * 5/2002 | Nakayama et al. ......... 359/701 |
| 6,490,097 B2 | * 12/2002 | Noguchi ..................... 359/694 |

FOREIGN PATENT DOCUMENTS

| JP | H07-318780 | 12/1995 |
| JP | H09-191675 | 7/1997 |

* cited by examiner

Primary Examiner—Ricky L. Mack
(74) Attorney, Agent, or Firm—Cowan, Liebowitz & Latman, P.C.

(57) ABSTRACT

A multiplying mechanism is arranged between a drive source and a mechanism that transmits a rotary output from the drive source to a driven portion. A rotation information detecting unit that outputs rotation information is rotated in synchronism with the multiplying mechanism.

6 Claims, 4 Drawing Sheets

POWER TRANSMISSION DEVICE, LENS BARREL, AND IMAGE PICKUP APPARATUS

BACKGROUND OF THE INVENTION

1. Field of the Invention

The present invention relates to a power transmission device that transmits power to a driven portion, a lens barrel, and an image pickup apparatus.

2. Related Background Art

In a conventional image pickup apparatus such as a camera, the driving force of a motor is amplified through a speed reducing mechanism, and a lens barrel provided with a cam and a helicoid screw is rotated by the torque thus generated to thereby move the lens barrel. In this case, the movements of the lens barrel as a driven member can be obtained by counting the output pulse of a pulse encoder operatively coupled to the lens barrel, for example. At this time, the pulse encoder effects the pulse output by reading the number of revolutions of a pulse disk or pulse blade on the motor shaft by a detecting unit such as a photo interrupter.

In this connection, when a drive source of low rotational speed but high torque such as an ultrasonic motor is used, the reduction ratio of the speed reducing mechanism can be set smaller than in the case where a drive source of high rotational speed such as an electromagnetic motor is used. Also, high-precision resolution can be attained for the movements of the lens barrel. However, to attain requisite resolution with a lens barrel for which a small reduction ratio is set by using a low-speed motor, it is necessary, as disclosed in Japanese Patent Application Laid-Open No. H07-318780 and Japanese Patent Application Laid-Open No. H09-191675, for example, to additionally provide a multiplying unit so that the requisite number of pulses can be attained or to enlarge the encoder so that greater pulse output can be obtained per one rotation of the motor.

FIG. 4 schematically illustrates a zoom driving system of a conventional lens barrel in the case where a low-speed drive source is used. In the construction shown in FIG. 4, a multiplying gear train (multiplying means) is provided separately from a speed reducing gear train. The speed reducing gear train consists of a zoom motor 17, gears 18 to 21, and a drive ring 12. The multiplying gear train consists of a gear 13 and a gear 14, the gear 14 rotating with a pulse disk 16, which constitutes an encoder together with a photo interrupter 15, fixed thereto. Therefore, the output of the zoom motor 17 is multiplied, making it possible to obtain a greater number of pulses.

The above-proposed device, however, requires that the multiplying unit be additionally provided, lading to an increase in the size of the device. Likewise, the method of increasing the pulse output per one motor rotation by enlarging the encoder leads to an increase in the size of the device.

Further, with the device constructed as shown in FIG. 4, the gear having undergone speed multiplication in the multiplying gear train is not applied with a large load and thus rotates at a relatively high speed. Thus, the contact noise between the gear teeth increases, causing discomfort. As a conceivable solution to this problem, tension or load may be applied so as to prevent the gears from rolling uncontrollably, but this results in reduced output and involves a further increase in size.

SUMMARY OF THE INVENTION

It is an object of the present invention to provide a power transmission device, a lens barrel, and an image pickup apparatus which are capable of providing rotation information of requisite resolution without compromising miniaturization and noise reduction.

According to one aspect of the present invention, there is provided a lens barrel including: a barrel having a lens moving unit which moves a lens in an optical direction; a drive unit; a transmission unit that transmits power by using a speed reducing mechanism and a multiplying mechanism, the speed reducing mechanism transmitting power from the drive unit to the lens moving unit, the multiplying mechanism being arranged between the speed reducing mechanism and the drive unit; and a detecting unit that detects information corresponding to a movement amount of the lens while rotating in synchronism with the multiplying mechanism.

Further, according to another aspect of the present invention, there is provided a power transmission device including: a speed reducing mechanism that transmits an output from a drive source to a driven portion; a multiplying mechanism arranged between the speed reducing mechanism and the drive source; and a rotation information detecting unit that detects and outputs rotation information, wherein the rotation information detecting unit is rotated in synchronism with the multiplying mechanism.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
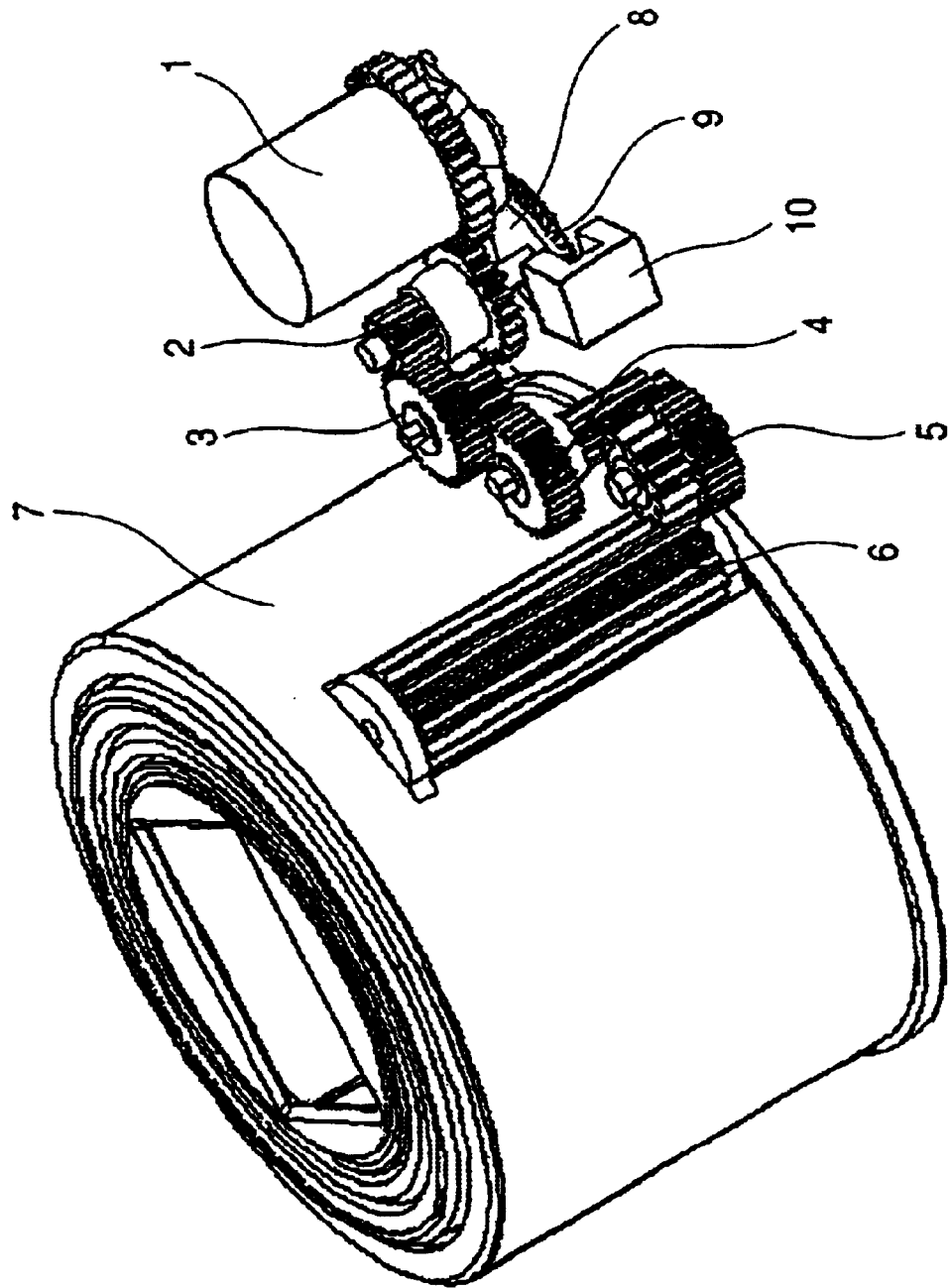
FIG. 1 is a perspective view showing the general construction of a zoom lens barrel according to an embodiment of the present invention.

Next, an embodiment of the present invention is described with reference to the drawings.

Hereinbelow, the present invention is described in detail based on the embodiment thereof shown in the drawings.

FIG. 1 is a schematic perspective view of a zoom lens barrel according to an embodiment of the present invention. The power transmission system of the zoom lens barrel of this embodiment is composed of: a gear train consisting of gears 2 to 6 for transmitting the rotary output of a zoom motor 1 to a lens barrel 7 having in the interior thereof a zoom lens and lens moving unit (both are not shown) that moves the lens in the optical direction; a pulse disk mounting disk 8 mounted integrally to the shaft of the gear 2; a pulse disk 9; and a photo interrupter 10 through which slits formed in the pulse plate 9 pass, intermittently permitting unobstructed passage of light through the optical path in the photo interrupter 10.

With this construction, the lens barrel can be zoom-driven while the rotation amount is detected.

Figure 2:
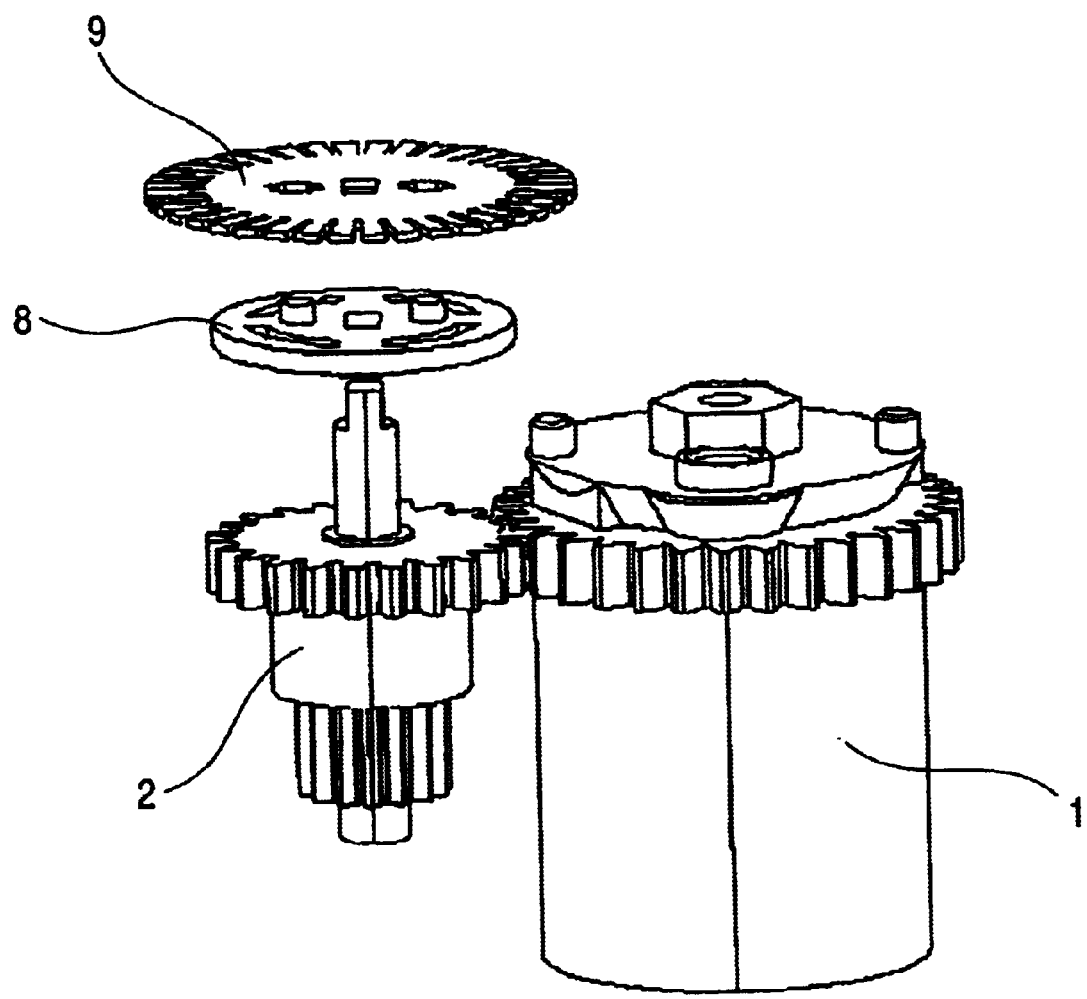
FIG. 2 is an enlarged perspective view showing the construction of a main portion of the zoom lens barrel of FIG. 1.

FIG. 2 is an enlarged perspective view showing the construction of a main portion of the present invention. The pulse disk mounting disk 8 is fitted to the shaft of the gear 2, and an adhesive is filled into groove portions formed on the top of the pulse disk mounting disk 8. Then, the pulse disk 9 is fitted to two protrusions formed on the top of the pulse disk mounting disk 8, thus bonding the pulse disk 9 onto the pulse disk mounting disk 8. By thus employing the above method in which the adhesive is filled into the groove portions formed on the top of the pulse disk mounting disk 8, the pulse plate 9 can be fixed in position without an increase in its height position due to the adhesive applied. In addition, the pulse disk 9 can rotate in a stable manner because a large contact area can be secured for the pulse disk 9.

The pulse disk 9 is provided with several tens of slits so that sufficient resolution can be attained even at low rotational speed. Further, a large-diameter gear of the gear 2 has a smaller number of teeth than the gear of the zoom motor 1, thus permitting speed multiplication.

Figure 3:
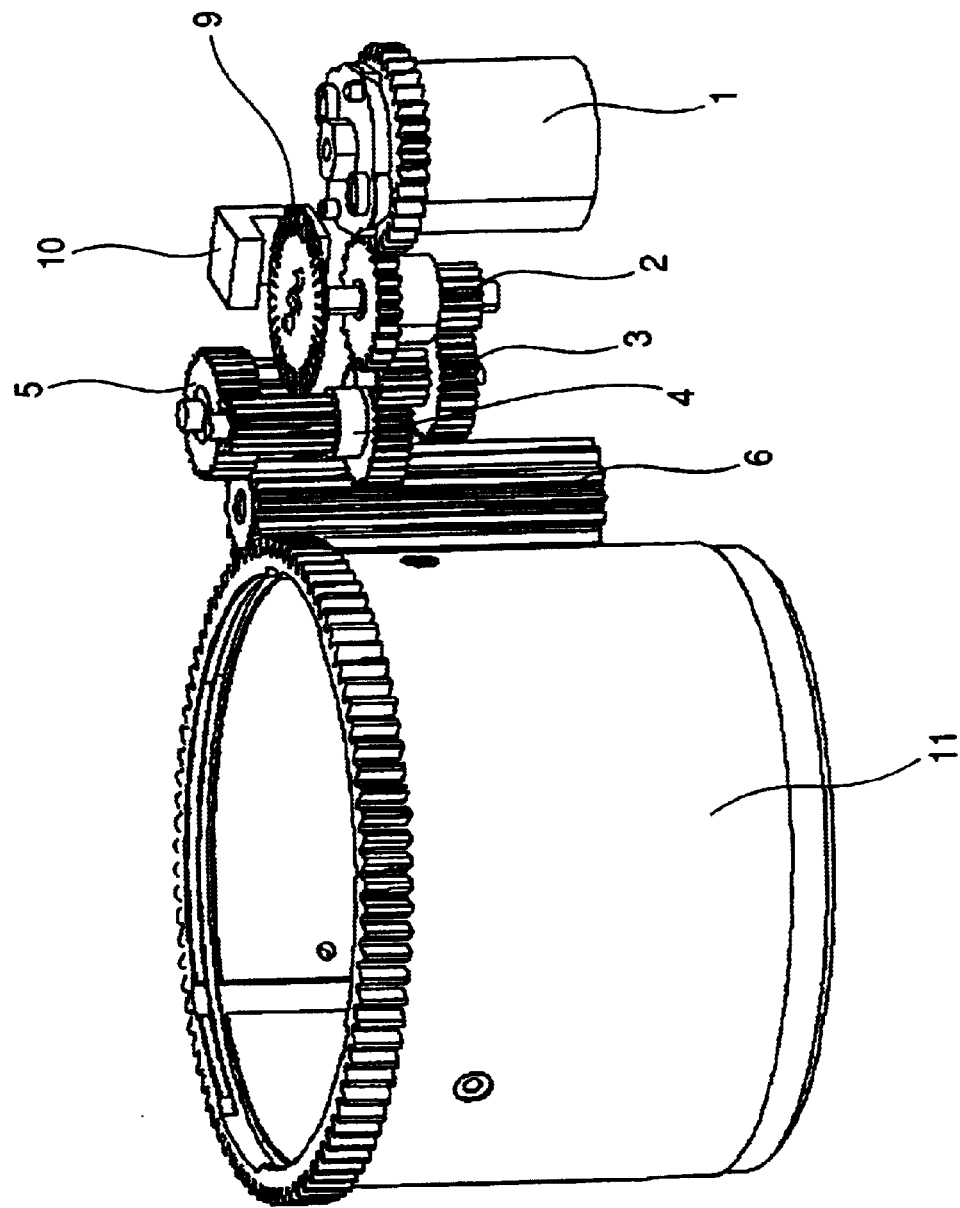
FIG. 3 is a perspective view showing how gears are connected to one another in the zoom lens barrel of FIG. 1.
Figure 4:
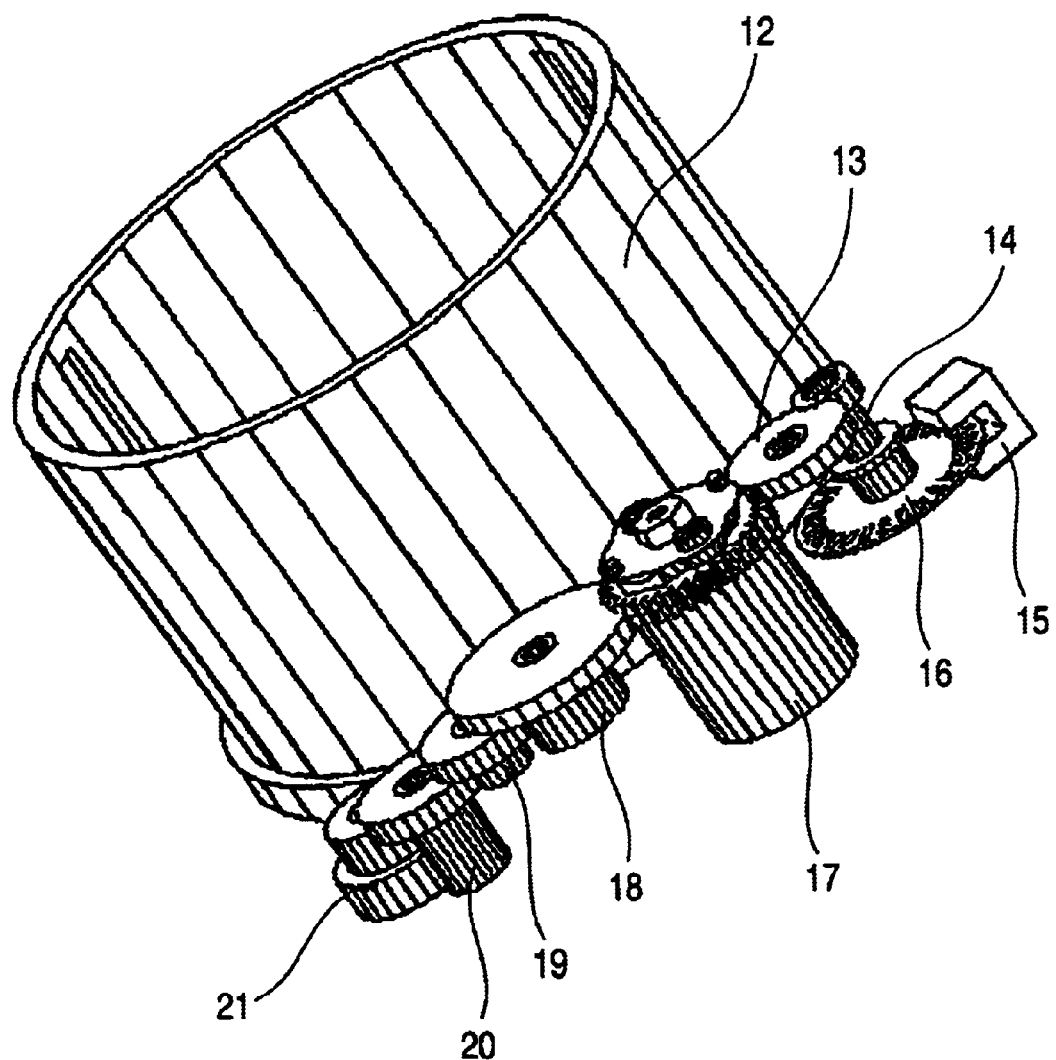
FIG. 4 is a perspective view showing the general construction of a conventional lens barrel in which a multiplying system is provided for effecting detection.

FIG. 3 plainly illustrates how the gear connection is effected in the zoom portion within the lens barrel 7. As stated above, the rotary output of the zoom motor 1 undergoes speed multiplication as it is transmitted from the motor 1 to the gear 2; in the gear train from a small-diameter gear of the gear 2 onwards, the output undergoes progressive speed reductions as it is transmitted from one gear to another, with the output eventually reaching a drive ring 11 to attain a torque necessary for effecting zoom operation of the lens barrel 7.

According to the above-described embodiment, resolution necessary for driving the lens barrel can be attained even with drive sources of low rotational speed such as an ultrasonic motor. Furthermore, it is possible to achieve a reduction in the noise of the rotation information detecting system, and miniaturization of the zoom lens barrel and therefore miniaturization of the apparatus in which the lens barrel is mounted, such as an image pickup apparatus.

More specifically, the construction shown in FIG. 2 is employed to detect rotation information. That is, of the gears constituting the gear train through which the rotary output of the zoom motor 1 is transmitted to the lens barrel 7 (drive ring 11), the first-stage gear 2 having the pulse disk 9 secured to its shaft has fewer teeth than the gear of the zoom motor 1, whereby the gear 2 rotates at an rpm that is multiplied from that of the zoom motor 1, making it possible to attain resolution necessary for controlling the lens barrel. Therefore, as compared with conventional constructions in which a multiplying system for detecting rotation information is provided in addition to a speed reduction system for transmitting the rotary output of a motor to a lens barrel, it is possible to achieve simplified construction of the gear train and miniaturization of the zoom lens barrel.

Further, a speed reducing gear train is connected in the gear stages situated after the multiplying gear train, that is, from the gear stage next to the gear 2 onward, which means that a certain load is imposed on the gears in the speed reducing gear train. This load serves to prevent the gears having undergone speed multiplication from rolling uncontrollably. As a result, the drive noise is reduced as compared with a case where a multiplying system for detecting rotation information is provided separately from a speed reducing system.

While in the above-described embodiment the description is directed to an example in which the driven portion, to which power is transmitted from the drive source, is the lens barrel 7 that retains the zoom lens (not shown) so as to allow the movement of the zoom lens in the optical direction, this should not be construed restrictively. The driven portion may also be a lens barrel having a built-in focus lens or an image pickup apparatus equipped with such a lens barrel. Other than those mentioned above, also applicable are devices or apparatus which transmit power to a driven portion for which fine movements need to be achieved by using a low-speed motor such as an ultrasonic motor and thus setting the reduction ratio small, and which provide high-precision resolution in controlling the movements.

As described above, the present invention can provide a power transmission device, a lens barrel, and an image pickup apparatus which are capable of providing rotation information of requisite resolution without compromising miniaturization and noise reduction.

As many apparently widely different embodiments of the present invention can be made without departing from the spirit and scope thereof, it is to be understood that the invention is not limited to the specific embodiments thereof except as defined in the claims.

What is claimed is:

1. A lens barrel comprising:

a barrel having a lens moving unit which moves a lens in an optical direction;

a drive unit;

a transmission unit that transmits power by using a speed reducing mechanism and a multiplying mechanism, the speed reducing mechanism transmitting power from the drive unit to the lens moving unit, the multiplying mechanism being arranged between the speed reducing mechanism and the drive unit; and a detecting unit that detects information corresponding to a movement amount of the lens while rotating in synchronism with the multiplying mechanism.

2. An image pickup apparatus comprising the lens barrel as set forth in claim 1.

3. A power transmission device comprising:

a speed reducing mechanism that transmits an output from a drive source to a driven portion;

a multiplying mechanism arranged between the speed reducing mechanism and the drive source; and a rotation information detecting unit that detects and outputs rotation information, wherein the rotation information detecting unit is rotated in synchronism with the multiplying mechanism.

4. A power transmission device according to claim 3, wherein the drive source comprises an ultrasonic motor.

5. A power transmission device according to claim 3, wherein the multiplying mechanism is arranged in a stage situated next to the drive source and wherein the speed reducing mechanism is connected in a stage situated after speed multiplication is effected in the multiplying mechanism.

6. A power transmission device according to claim 3, wherein the multiplying mechanism comprises a multiplying gear, the multiplying gear having attached thereto a disk with a pattern constituting the rotation information detecting unit.

* * * * *